(12) United States Patent
Moody

(10) Patent No.: US 8,801,095 B2
(45) Date of Patent: Aug. 12, 2014

(54) DEPLOYABLE CHAIR FOR STROLLER COUPLING

(71) Applicant: Philip D Moody, Monroe, NJ (US)

(72) Inventor: Philip D Moody, Monroe, NJ (US)

(*) Notice: Subject to any disclaimer, the term of this patent is extended or adjusted under 35 U.S.C. 154(b) by 0 days.

(21) Appl. No.: 13/573,527

(22) Filed: Sep. 21, 2012

(65) Prior Publication Data

US 2014/0084641 A1  Mar. 27, 2014

Related U.S. Application Data

(60) Provisional application No. 61/657,177, filed on Jun. 8, 2012.

(51) Int. Cl.
*A47C 15/00* (2006.01)

(52) U.S. Cl.
USPC .......... 297/248; 297/16.1; 297/146; 297/234

(58) Field of Classification Search
USPC ........ 297/16.1, 18, 184.16, 188.06, 240, 241, 297/242, 248, 256.12, 373, 364, 365
See application file for complete search history.

(56) References Cited

U.S. PATENT DOCUMENTS

| | | | |
|---|---|---|---|
| 6,969,112 B1* | 11/2005 | Sherrill | 297/16.1 |
| 7,540,561 B2* | 6/2009 | McWhorter et al. | 297/184.16 |
| 7,677,585 B2* | 3/2010 | Rohl | 280/203 |
| 8,128,103 B1* | 3/2012 | Schutzendorf et al. | 280/33.993 |
| 2007/0114738 A1* | 5/2007 | Jones et al. | 280/32.7 |

* cited by examiner

*Primary Examiner* — David R Dunn
*Assistant Examiner* — Jody Giacoman
(74) *Attorney, Agent, or Firm* — Charles I. Brodsky

(57) ABSTRACT

A chair including a fold down seat which is closed against the side or rear of a stroller or wheelchair for transit or storage, but which is deployable to rotate outwardly therefrom for sitting upon when desired.

6 Claims, 12 Drawing Sheets

DEPLOYABLE CHAIR FOR STROLLER COUPLING

CROSS-REFERENCE TO RELATED APPLICATIONS

A Provisional Patent Application covering the invention described herein was filed on Jun. 8, 2012, and assigned Ser. No. 61/657,177.

STATEMENT REGARDING FEDERALLY SPONSORED RESEARCH OR DEVELOPMENT

None.

REFERENCE TO A MICROFICHE APPENDIX

None.

BACKGROUND OF THE INVENTION

1. Field of the Invention

This invention relates to a deployable chair coupling, in general, and to a swivel/collapsible seat attachment especially attractive in outdoor use, in particular.

2. Description of the Related Art

One of the everyday vitamins receiving increased attention of late is the so-called Vitamin N—for "nature". Several of the professed reasons for this are that: 1) Nature brings the human senses alive; 2) Humans are hard-wired to love and to need exposure to the natural world; 3) Spending more time outdoors nurtures a human's "nature neurons" for creativity, memory, performance and increased attention spans; 4) Improves psychological well being with less anxiety, anger or depression when exposed to nature's environment; 5) Access to the natural world is a connection to one's part of humanity.

Evaluation and analysis has shown that such "vitamin" is of importance to young and old alike.

An individual occupying a stroller or wheelchair can attain these benefits, but the pushing about of the stroller or wheelchair can both be an annoyance at the least to the one doing the pushing, and an arduous task at the most. Specifically, many individuals spend a good portion of their day pushing a stroller or a wheelchair for a loved one. When doing so in a park setting, benches can usually be found to sit upon for periodic resting, or to sit at for longer periods of time. When in a situation where seating cannot readily be found or is limited, on the other hand, many of these individuals use a rail, fence or wall support to lean upon or against. While shopping at the mall or outlets, for example, this also can be an uncomfortable and oftentimes unsanitary experience. Where the one doing the pushing is pregnant or is himself/herself elderly, being on one's feet for extended periods of time doing the pushing about can be quite difficult—such as with a pregnant mother waiting at the bus stop for her other child to arrive home from school. With them, especially, the need exists for a comfortable chair to allow them to take a moments respite and re-energize themselves before continuing onward.

OBJECTS OF THE PRESENT INVENTION

It is an object of the present invention to provide an alternative to the carrying along of a separate chair to rest upon as needed when pushing an occupied stroller or wheelchair about.

It is an object of the invention, therefore, to provide an auxiliary seat as part of the stroller or wheelchair construction to begin with.

It is another object of the invention to provide a collapsible chair of this type which can be easily deployed from the stroller or wheelchair for use and easily retracted into it for storage.

It is a further object of the invention to provide a collapsible seat design as an after-market item which can itself be coupled to existing strollers and wheelchairs for use or storage as circumstances warrant.

It is yet a further object of the invention to provide a chair of this type which can be collapsed and swivel-secured for storage on a stroller or wheelchair, as well as being swivel-released and deployed for use with the stroller or wheelchair.

SUMMARY OF THE INVENTION

As will become clear from the following description, the deployable, collapsible chair of the invention—simply termed a "Buddysitter"—provides individuals with a place to sit when comfortable seating is non-existence. Easily swivable out from the side or rear of the stroller or wheelchair, the chair affords parents and caregivers the opportunity to stop and rest in virtually any type of situation. At the same time, the chair of the invention additionally allows the individual to sit next to their loved one in the stroller or wheelchair, without having to find separate seating, or having to transport a bulky chair about with them. The end result will be seen to be a convenience in facilitating the taking of the stroller or wheelchair outdoors for the loved ones to enjoy nature, similar to the ways humans prefer to live in houses and like accommodations with available, appealing views of the natural world.

As will become clear from the following description, the auxiliary chair of the invention includes a fold-down seat which is closed against the rear of the stroller or wheelchair for transit or storage but which is deployable to rotate outwardly therefrom for sitting upon when desired. The seat has a back portion hinged to a bottom portion having an underside recess in which support legs are foldable downwardly from or upwardly into. A side edge of the back portion includes a tubular mount through which a rod of lesser cross section passes in allowing the back portion to rotate about the rod and to controllably slide along it vertically. Usable for coupling the seat to the rear of the stroller or wheelchair, the chair for the stroller also includes a second tubular mount for the bottom portion of the seat having its own lesser cross section rod passing through it to allow the bottom portion of the seat to rotate about this rod and to controllably slide along it horizontally. Such version allows storage of the auxiliary chair on the side of the stroller so as not to discomfort a child or infant lying on its back. In this embodiment, also, the second tubular mount includes a bracket with a toothed gear to mesh with a second toothed gear added to the stroller frame to allow the chair to sit flat on the ground when opened, no matter what the design or shape of the stroller might happen to be.

BRIEF DESCRIPTION OF THE DRAWINGS

These and other features of the invention will be more clearly understood from a consideration of the following description, taken in connection with the accompanying Drawings, in which.

DETAILED DESCRIPTION OF THE INVENTION

As an overview, the deployable chair coupling "Buddysitter" of the invention provides users with a comfortable seat attachable to a stroller or wheelchair. The chair can be attached by means of brackets to the frame of the stroller or wheelchair and attaches to a swivel arm that connects to a mount for the brackets. The mount can be positioned vertically or horizontally, depending on the style/configuration of the stroller or wheelchair. A bolt and wing nut combination is included to vary the angle of the mount through adjustment, turning two meshed teeth gears in locking them together in desired position. In a preferred embodiment of the invention, the mount includes an extension piece in which metal clasps secure the seat to the stroller or wheelchair. Two straps are included for stabilizing the chair once deployed, with the chair being able to glide back and forth inside a slide mount. A pull and release knob holds the slide in the desired position.

The chair legs are collapsible by folding in on one another, in allowing the chair to be folded up to the back or side when not in use. The seat may be hinged together at the bottom and at the back, with the seat being of a lightweight durable plastic fabrication. The end result allows the seat and chair to fold up for storage when pushing the stroller or wheelchair about. With the legs of the chair able to be folded up into the recessed bottom, and with the front legs able to fold together as well as the back legs, the chair could be made in various sizes, colors or designs. Of course, the exact specifications may vary from one stroller or wheelchair configuration to another, and the seat back may include an interchangeable or personalized plate identifying the user and/or other personalized feature.

Figure 1:
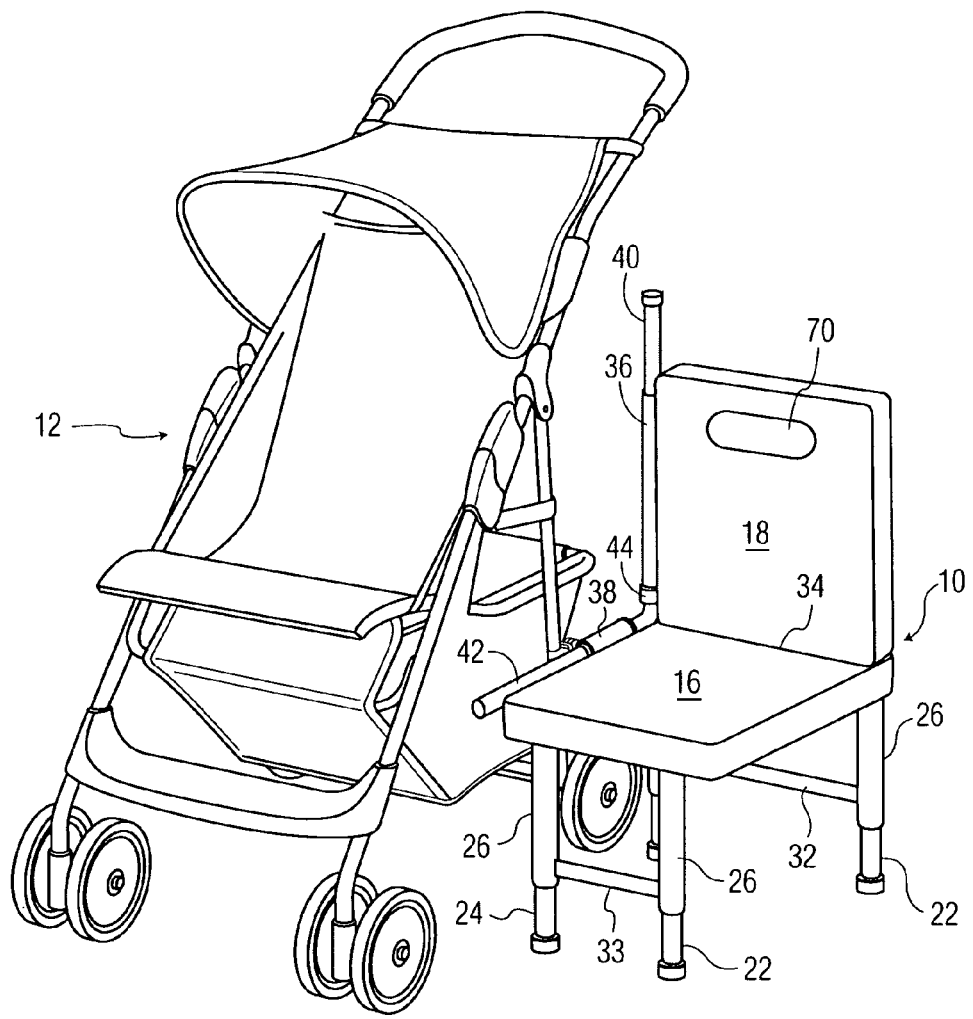
FIG. 1 is a perspective view of the collapsible chair of the invention in its deployed position at a left side of a typically configured stroller.
Figure 11:
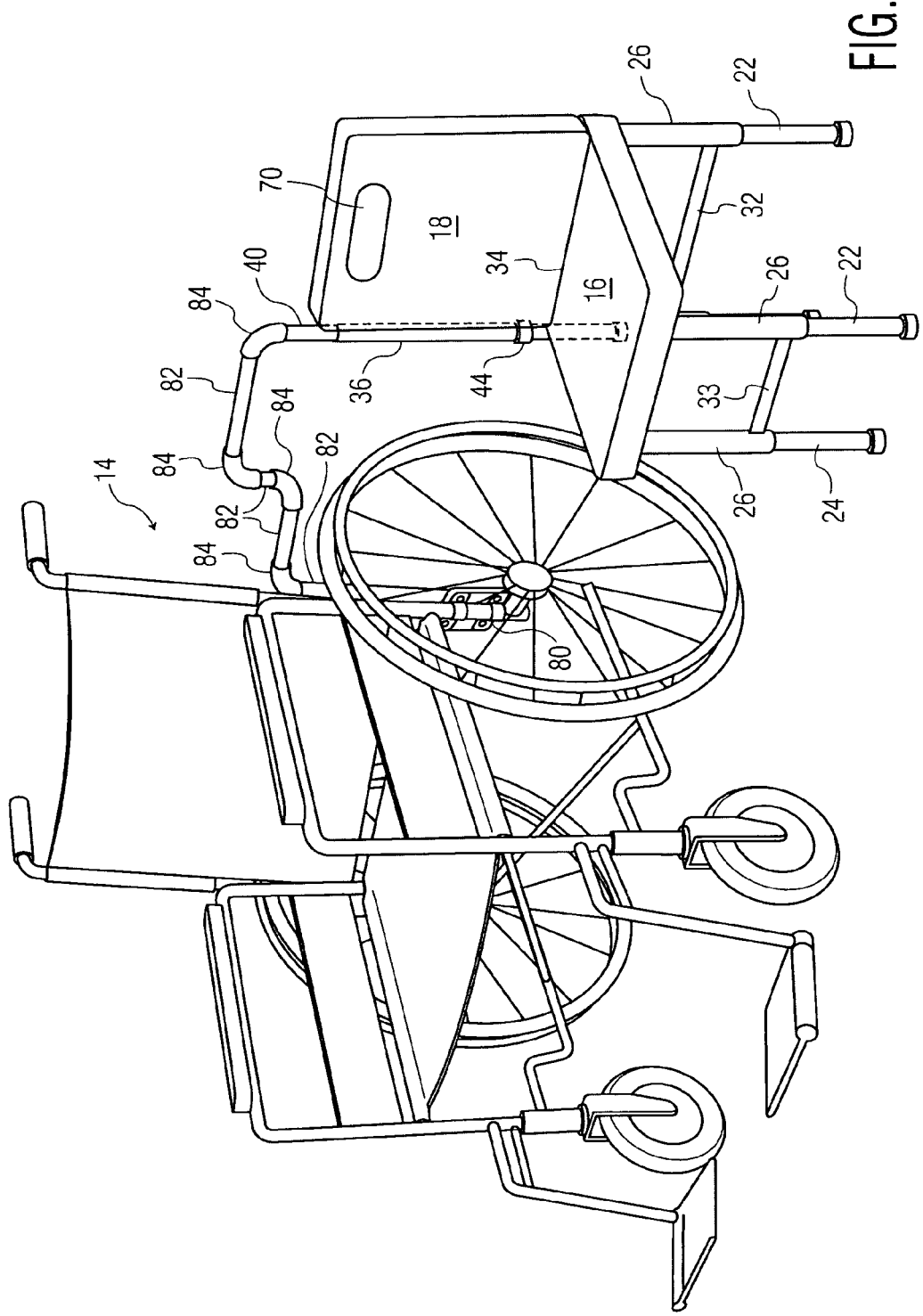
FIG. 11 is a perspective view illustrating a deployment of the collapsible chair with a wheelchair.

Thus, in FIGS. 1 and 11, the collapsible chair is shown at 10, a stroller at 12, and a wheelchair at 14. Any type of stroller or wheelchair construction is appropriate.

Figure 4:
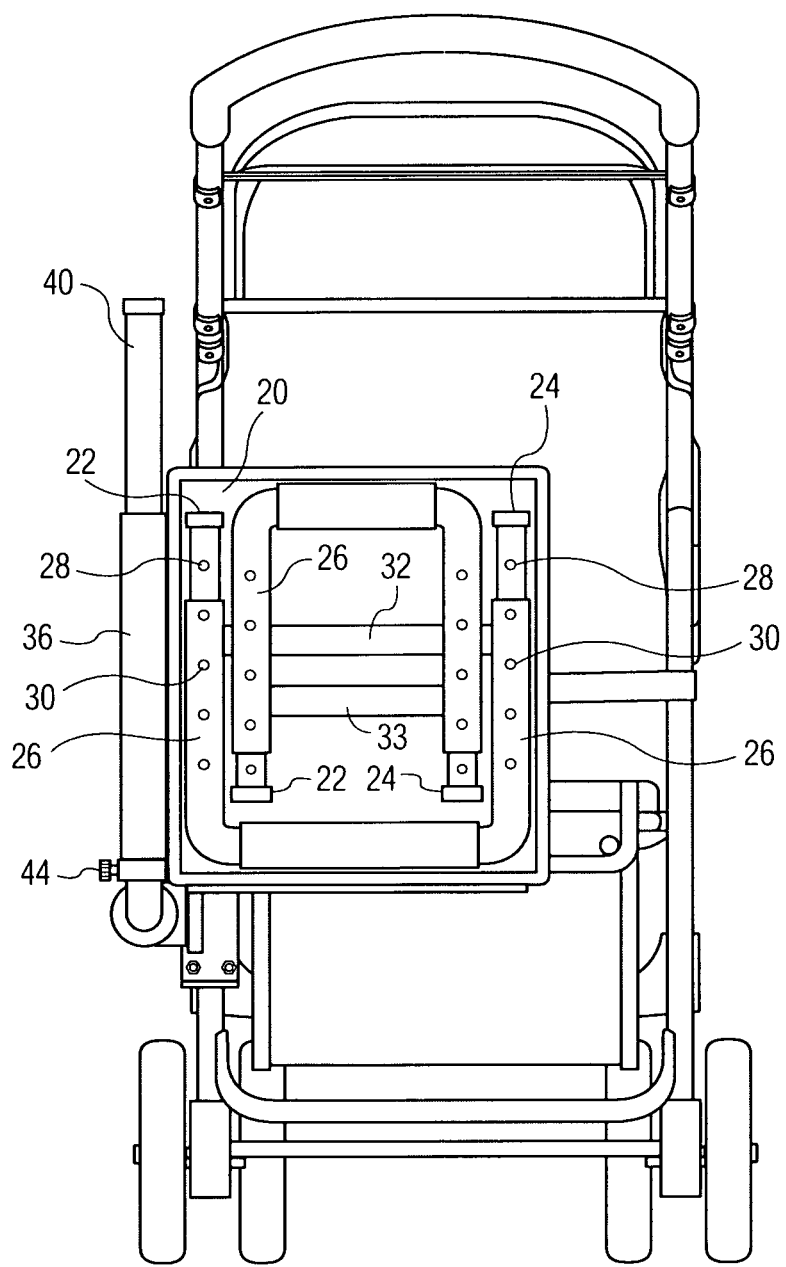
FIG. 4 is a rear view of the stroller of FIG. 3 with the retracted collapsible chair.
Figure 9:
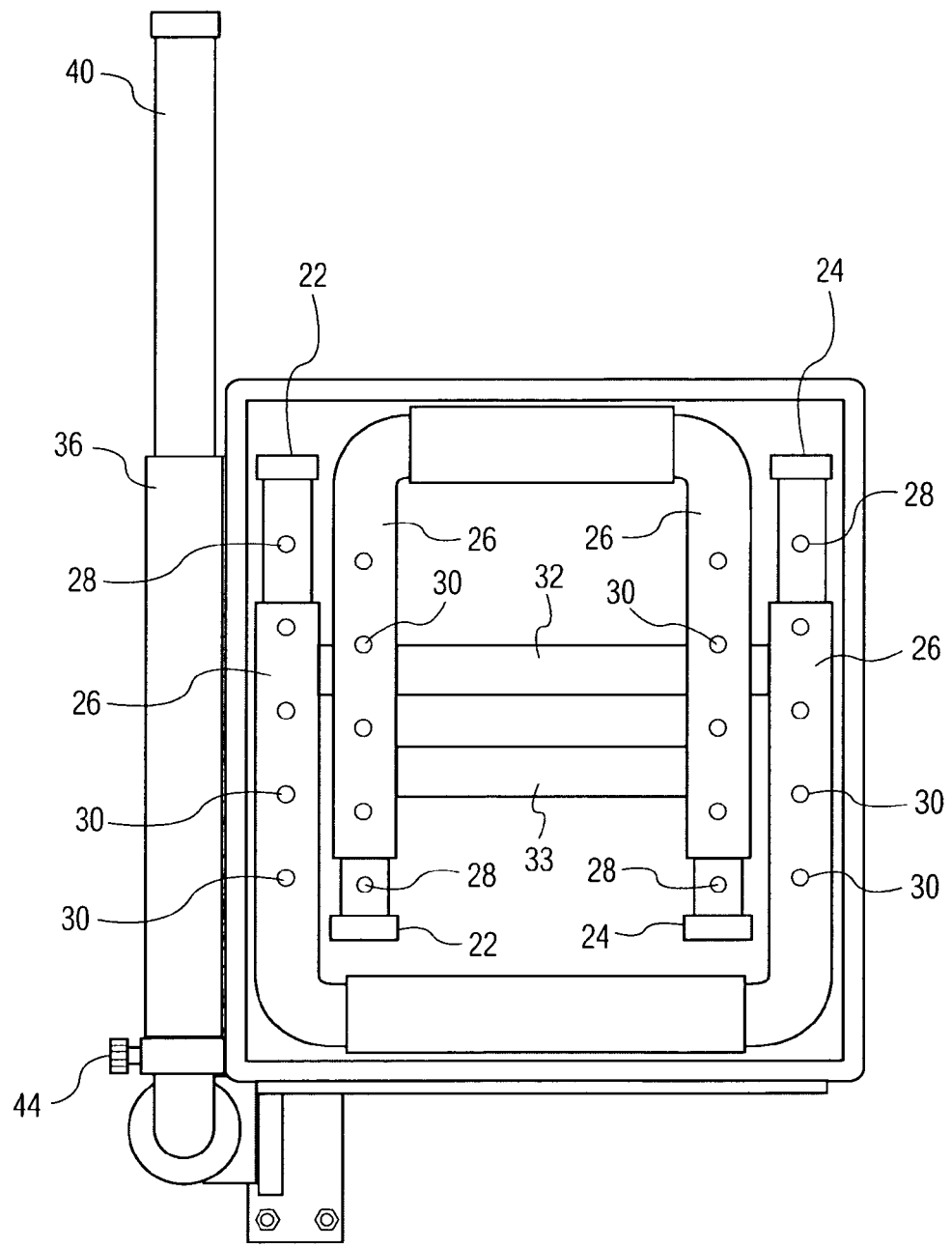
FIGS. 9 and 10 are rear and left side views, respectively, of a stroller construction helpful in an understanding of the swivel action and securement of the collapsible chair in its deployed and retracted state.
Figure 12:
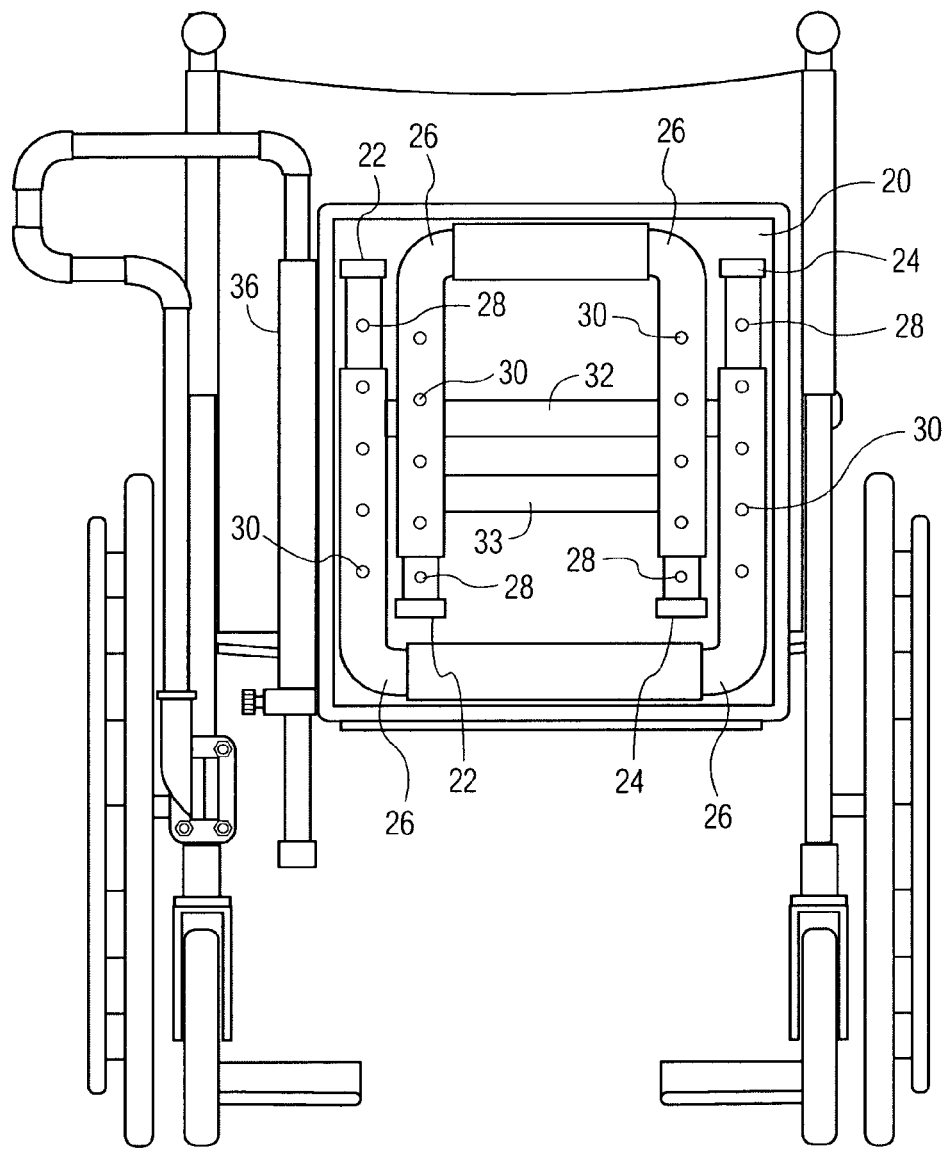
FIG. 12 is a rear view of the wheelchair of FIG. 11 showing the chair of the invention in its retracted position.

The seat of the chair has a bottom portion 16 and a back portion 18. The bottom portion 16 has a recessed underside 20 in which legs are hinged or otherwise secured to fold upwardly for storage or downwardly for deployment in supporting the seat. FIGS. 4, 9 and 12 show the recessed underside 20 as including two sets of paired legs 22, 24 in their fold-up position for storage and transit. Each leg is configured to telescope inwardly and outwardly from a tubular enclosure 26 for length adjustment, with nibs 28 to fit selected apertures 30 of the enclosure 26 to lock the legs at the desired height for the chair. Pairs of support straps 32, 33 extend between the legs to provide stability when folded down and to rotate together with the legs 22, 24 as the legs are folded.

The back portion 18 of the seat is hinged or otherwise secured to the bottom portion 16 at 34. A first tubular sleeve 36 connects to a side edge of the back portion 18 of the seat, oriented vertically, while a second tubular sleeve 38 connects to a side edge of the bottom portion 16 of the seat, oriented horizontally. A first rod 40 traverses downwardly through the tubular sleeve 36, while a second rod 42 traverses forwardly through the tubular sleeve 38. Each rod is of a lesser cross-section than that of the sleeve through which it passes to allow the seat back portion 18 to swivel or rotate about the rod 40 and the seat bottom portion 16 to swivel or rotate about the rod 42. The difference in cross-section may be selected such as to also allow the seat back portion 18 to slide upwards and downwards along the rod 40, and to allow the seat bottom portion 16 to slide forward and rearward along the rod 42. A clamp 44 projects inwardly through an aperture in the sleeve 36 to secure the rod 40 in place as a height adjustment depending upon the style of the stroller or wheelchair. A pull and release knob 48 in the sleeve 38 secures to the rod 42 in like manner to fasten the forward-rearward positioning of the seat. In a preferred embodiment the rods 40, 42 may be component sections of an L shaped rod.

Figure 2:
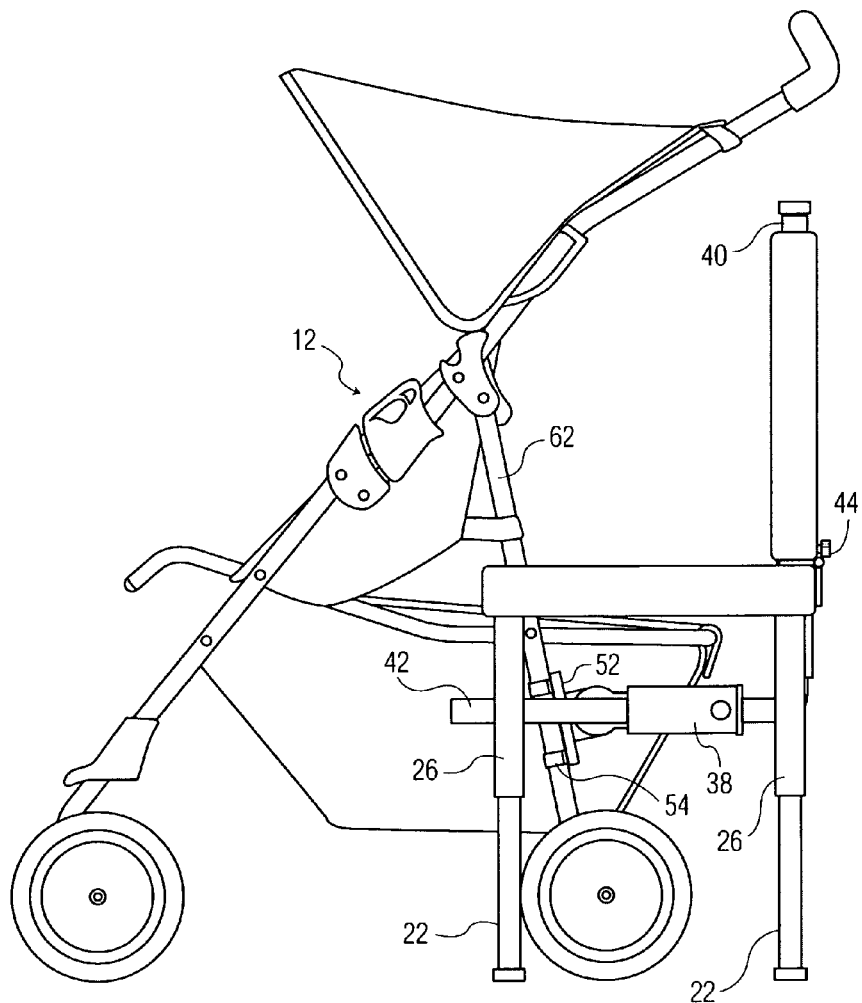
FIG. 2 is a left side view of the stroller with the collapsible chair deployed.
Figure 3:
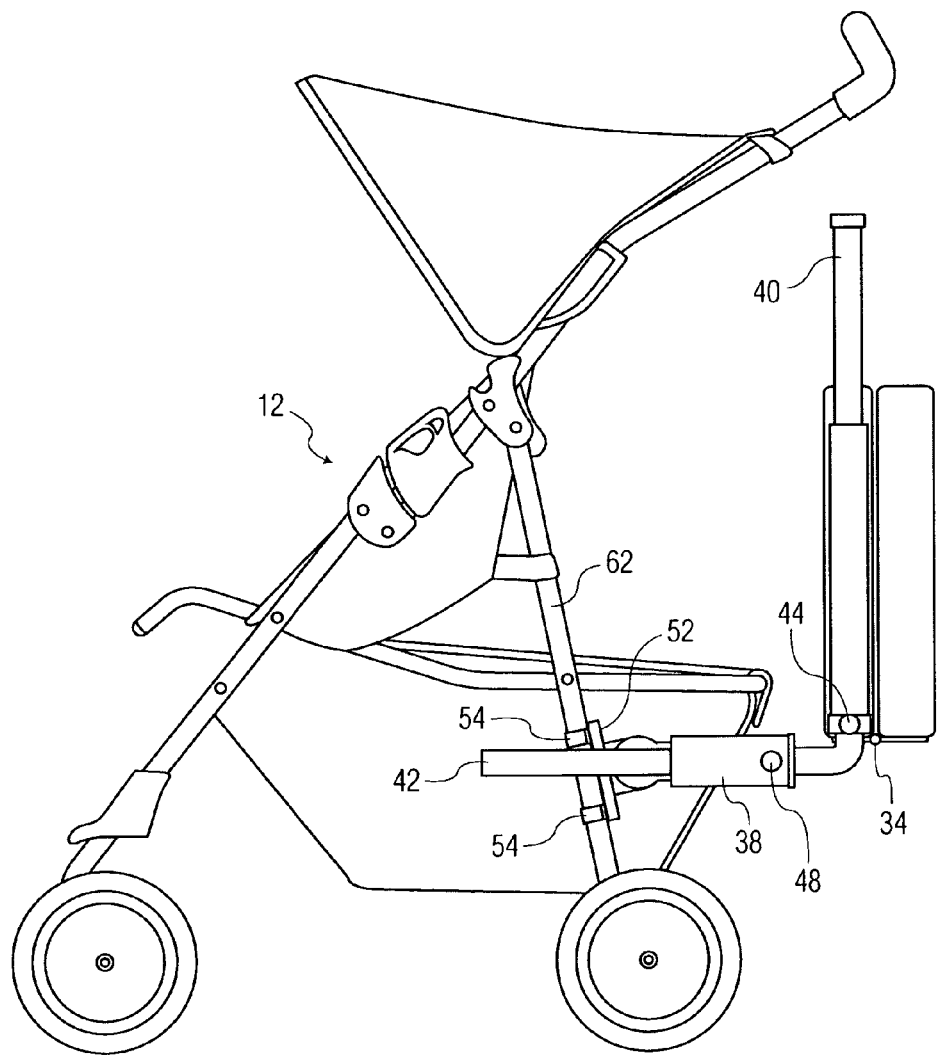
FIG. 3 is a left side view of the stroller with the collapsible chair retracted and secured at the rear of the stroller.
Figure 5:
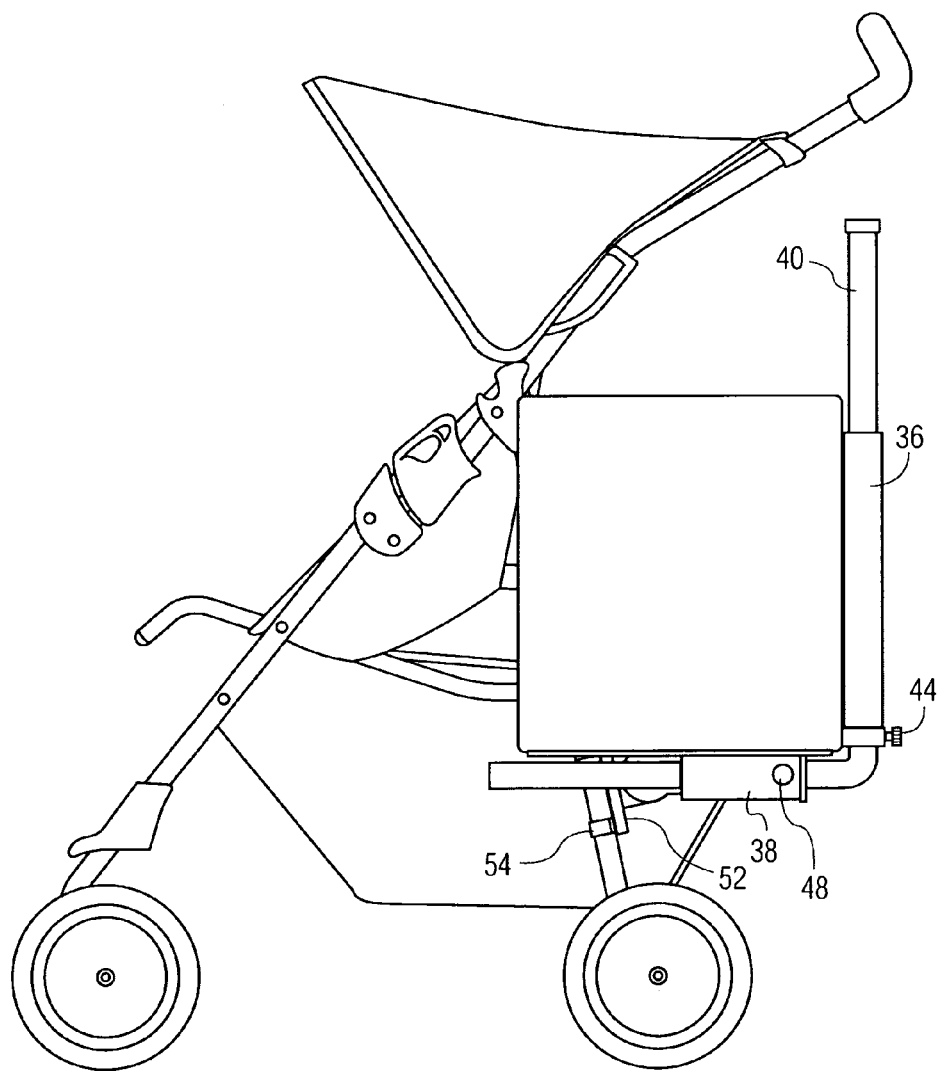
FIG. 5 is left side view of a stroller with the retracted collapsible chair at the side of the stroller.
Figure 6:
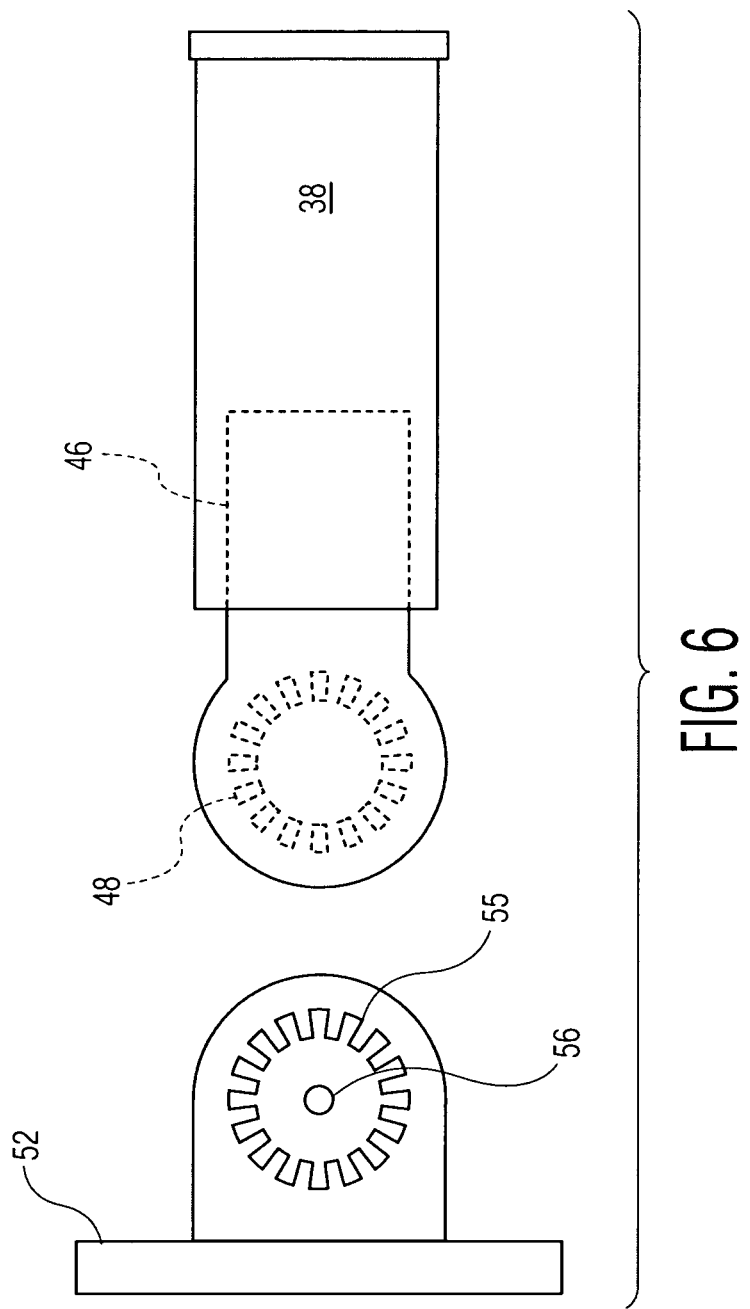
FIGS. 6-8 illustrate component parts of the collapsible chair helpful in an understanding as to how it can be swiveled into its deployed or retracted condition, how it can be secured in either placement, and how the angle of an included seatback can be changed.
Figure 7:
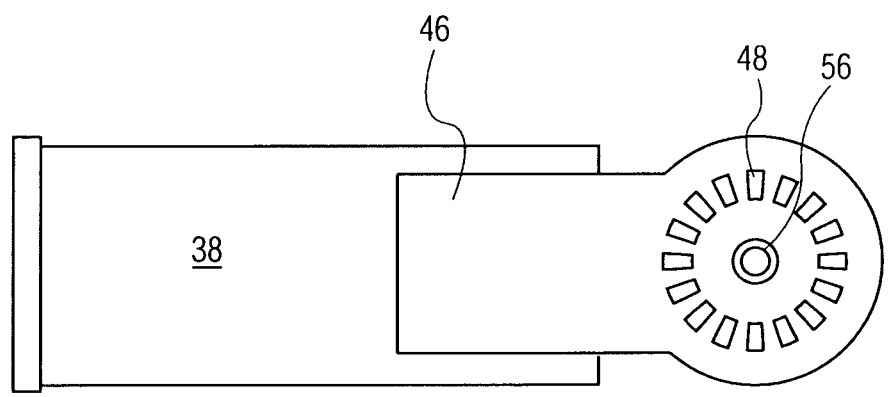
Figure 8:
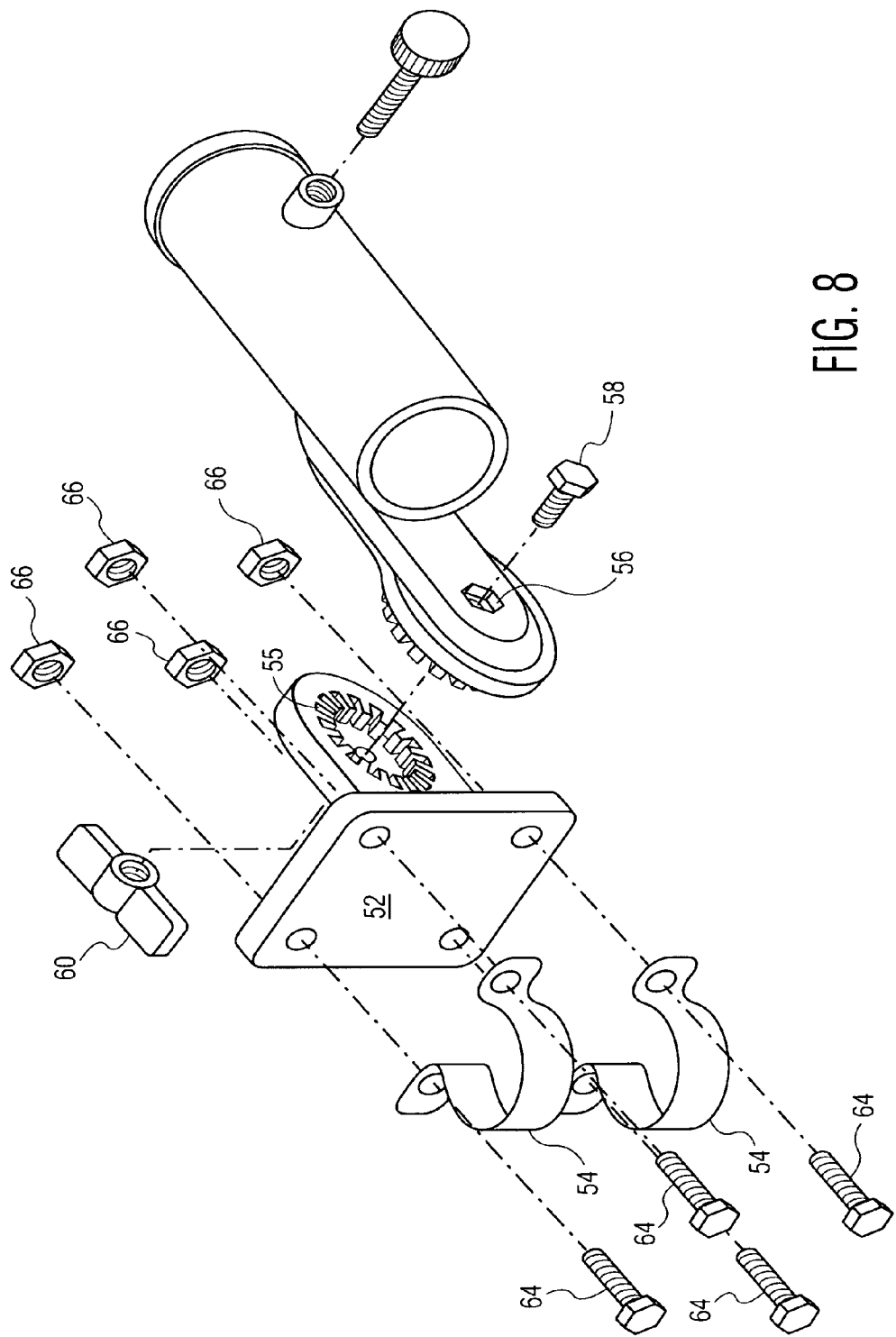
Figure 10:
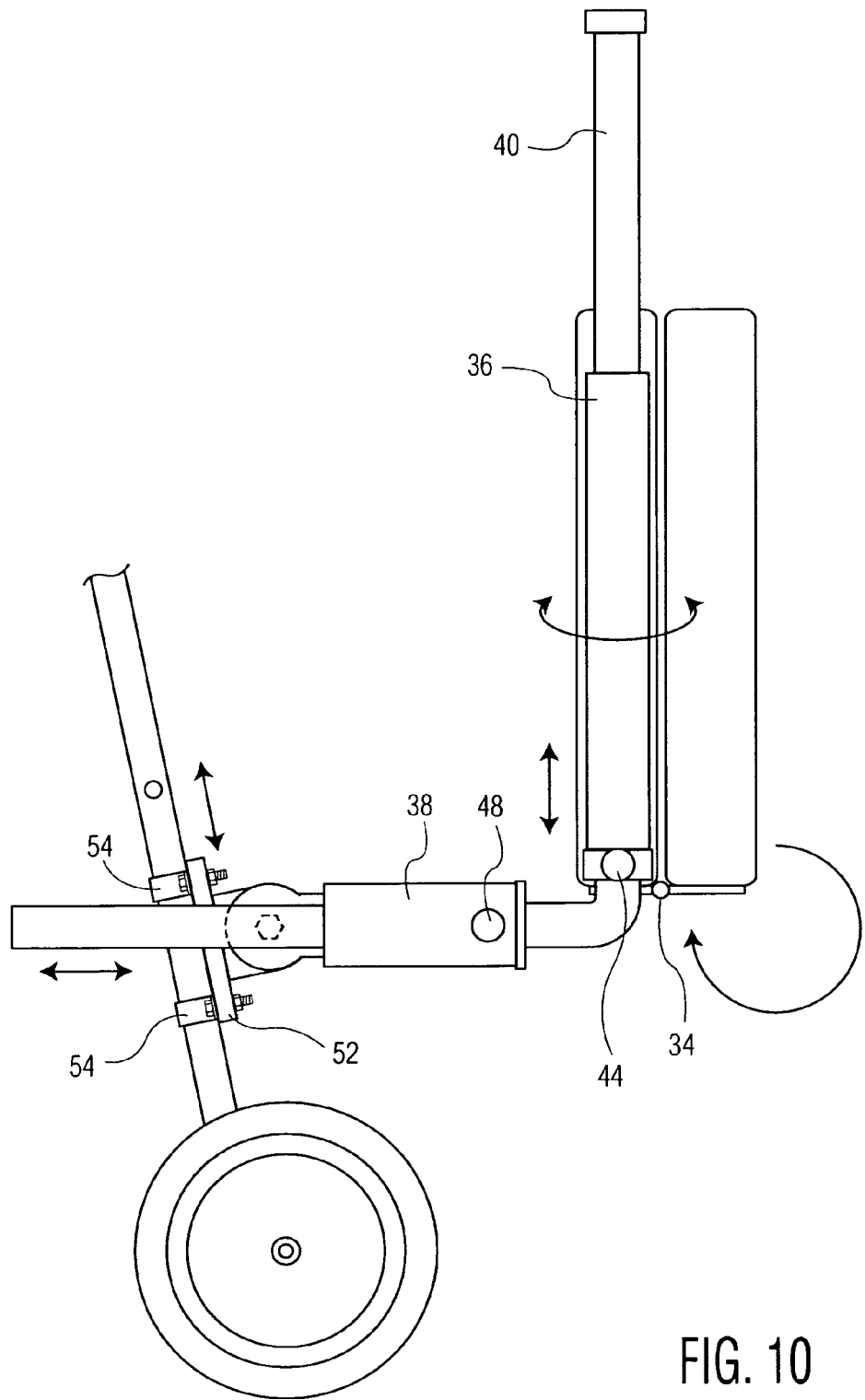

For the chair coupling to a stroller, the sleeve 38 couples to a bracket 46 having a first toothed gear 48 (FIG. 7). A frame mount 52 is secured to the stroller by a pair of clamps 54 (FIGS. 2, 3 and 5). The frame mount 52 includes a second toothed gear 55 which meshes with the toothed gear 48 by an aperture 56 receiving a bolt 58 through the gear 48 (FIGS. 6, 7 and 8). Controlled manual rotation of the gear 48 with respect to the gear 55 allows the frame mount 52 and bracket 46 to adjust their teeth and gear positionings for different angular stylings of the stroller to which the chair is to be attached. A wing-nut 60 holds the bolt 58 in place (FIG. 8). The frame mount 52 is secured to a side bar 62 of the stroller by the clamps 54 and by 4 bolts and nuts 64, 66 (FIGS. 8, 10).

A personalized nameplate 70 may be included at the back portion 18 of the seat.

For the chair coupling to a wheelchair, as in FIG. 11, the same back portion-hinged bottom portion, and the same recessed support legs are maintained. Also included is the tubular sleeve 36 along the side edge of the back portion 18, the rod 40 traversing through it of lesser cross-section and the securing clamp 44. As with the stroller, the support legs 22, 24 are of telescoping length, the back portion 18 is foldable onto and off of the bottom portion 16 and the collapsed chair in such manner is then rotatable about the rod 40. As wheelchair are substantially all of the same configuration, little need exists for any toothed gear meshing to orient the auxiliary chair with the wheelchair frame in order to have its legs rest flat, firmly on the ground as with the stroller arrangement of FIGS. 1 through 10. Instead, what is required is a frame mount of the type shown as 52 in FIG. 8 (with or without the toothed gear 55), together with its clamps 54 along with its bolts 64 and nuts 66 to secure firmly to the frame of the wheelchair, as at 80 in FIG. 11. The frame mount then receives one or more of a series of transverse rods 82 oriented to conform with the height of the deployable chair so that the chair stands flat on the ground—and so that when the chair is collapsed for transit or storage, it fits in position with the back of the wheelchair as in FIG. 12 or FIG. 5 as with the stroller. Four such rods are shown for purposes of illustration in FIG. 11, with the joins between them 84 essentially being rubber, plastic or like flexible sleeves of greater cross-section in allowing the individual rods 82 to swivel or bend in them in orienting the chair in proper position. Such couplings 84 orient the deployable chair with the wheelchair and the rod 40 in this manner to ensure that the rods 82 operate to set the deployable chair flat when the legs 22, 24 are folded downwardly.

Whereas there have been described what are considered to be preferred embodiments of the present invention, it will be readily appreciated by those skilled in the art that modifications can be made without departing from the scope of the teachings herein of providing a comfortable Buddysitter deployable chair for comfortable seating and attachment to a stroller or wheelchair. The seat portions are foldable one upon the other, the support legs are adjustable in height, the seating portion can be moved forwardly or rearwardly, and the back portion of the chair can be raised or lowered. While various interconnections can be made for coupling the deployable chair to the wheelchair configuration, like adjustments can be made with respect to the meshing toothed gears for the stroller coupling, both allowing the chair to stand flat on the ground. With either, the end result continues to be a chair particularly adapted for auxiliary use in resting upon after a period of pushing the stroller or wheelchair about becomes tiresome. With the deployable chair being able to be constructed in various sizes, colors, and designs independent of the appearance of the stroller or wheelchair to which it is coupled, its fabrication as an initial part of the stroller or wheelchair construction will be apparent. So, too, will be its after-market attachment to existing manufactures simply through the attachment of the frame mount 52 for the stroller or the frame mount 80 for the wheelchair—although frame mount 52 can be use for both. And, as will be appreciated, the Buddysitter chair could similarly be adapted for use with a motorized scooter and motorized wheelchair in offering the same advantages and benefits of the invention. For at least such reason, therefore, resort should be had to the claims appended hereto for a true understanding of the scope of the invention.

I claim:

1. A deployable chair for a stroller comprising:
    a foldable seat including a back portion hinged to a bottom portion having a recessed underside;
    support legs hinged to said recessed underside and and adapted to fold downwardly from and upwardly into said recessed underside;
    a first tubular mount of given cross-section extending vertically along a side edge of said back portion of said seat;
    a first rod within said first tubular mount of given cross-section to allow rotation of said back portion of said seat about said first rod;
    a first clamp coupled to said first tubular mount for controllably adjusting at least one of said rotation of said first tubular mount about said first rod and linear sliding of said first tubular mount along said first rod;
    a second tubular mount of given cross-section extending horizontally along a side edge of said bottom portion of said seat;
    a second rod within said second tubular mount of given cross-section to allow rotation of said bottom portion of said seat about said second rod;
    a second clamp coupled to said second tubular mount for controllably adjusting at least one of said rotation of said second tubular mount about said second rod and linear sliding of said second tubular mount along said second rod;
    means for coupling said second tubular mount to a frame of a stroller; and
    wherein said coupling means includes a bracket having a first toothed gear coupled to mesh with a second toothed gear mounted on said frame of the stroller.

2. The chair of claim 1 wherein said first rod is of lesser cross-section than said first tubular mount to allow upwards and downwards linear sliding of said back portion of said seat along said first rod.

3. The chair of claim 1 wherein said support legs are of adjustable length.

4. The chair of claim 1 wherein said second rod is of lesser cross-section than said second tubular mount to allow forward and rearward linear sliding of said bottom portion of said seat along said second rod.

5. The chair of claim 1 wherein said support legs are of an adjustable length.

6. The chair of claim 1 wherein said first and said second toothed gears mesh together for setting the chair flat on the ground when said support legs for said chair are folded downwardly.

* * * * *